Sept. 20, 1960  T. I. ERSTAD  2,953,184
SELF SEALING TUBELESS BICYCLE TIRE AND RIM
Filed Dec. 3, 1956

INVENTOR.
TENNES I. ERSTAD
BY
*Tennes I. Erstad*
ATTORNEY

United States Patent Office 2,953,184
Patented Sept. 20, 1960

2,953,184

SELF SEALING TUBELESS BICYCLE TIRE AND RIM

Tennes I. Erstad, Brooklyn, N.Y., assignor to American Machine and Foundry Company, a corporation of Arkansas Filed Dec. 3, 1956, Ser. No. 626,009

3 Claims. (Cl. 152—363)

This invention relates to bicycle wheels and particularly to self sealing tubeless bicycle tires and rims therefore and to the method of making the same.

Tubeless tires are presently used on automobiles and trucks but as far as known self sealing tubeless bicycle tires have never been provided for use on bicycles. One of the reasons why tubeless tires could not be readily employed on bicycle wheels has been due to the fact that air would leak out of the spoke tightening nipples which was not a problem in either the automobile or truck tire fields. In the truck and automobile fields the rim was made from an imperforate sheet of metal rolled into a circle of rim configuration and wherein only one hole for a valve stem was employed. Sealing this single hole against leakage was a far simpler task than sealing the multitudinous spoke tightening nipple holes found in a rim of a bicycle wheel.

Nevertheless, the advantages of a tubeless tire were well known and a need existed for such a tire which was not satisfied by the tube type tire currently employed and was not satisfied by the tubeless bicycle tire of several decades ago or the solid tire used prior to then. The tubeless tire of several decades ago had the advantage that it had to be glued to the rim by an adhesive and if any slippage occurred between the tire and the rim, it would tear the valve stem from the tire. The balloon tube type tire that is in use today has the disadvantage that it is easily punctured and it is often difficult to locate a hole in a bicycle tube. It was therefore necessary to provide a bicycle tire and rim which would overcome the disadvantages mentioned so as to enable bicycle users to enjoy the same advantages for their bicycles as was enjoyed by automobile and truck users employing tubeless tires.

It is an object of the present invention therefore to provide a self sealing tubeless tire for a bicycle.

Another object of this invention is to provide a self sealing tire that can be employed on rims designed for tube type tires.

It is a further object of this invention to provide a bicycle wheel employing a tubeless self sealing tire which will not have any slippage between the tire and the rim once it has been set in place and which will avoid the necessity of employing an adhesive between the tire and the rim to prevent such slippage from occurring.

Another object of this invention is to provide an improved self sealing valve plug which will be physically held closed by the air pressure in a tire.

Other objects and features of the invention will appear as the description of the particular physical embodiment selected to illustrate the invention progresses. In the accompanying drawings, which form a part of this specification, like characters of reference have been applied to the corresponding parts throughout the several views which make up the drawings.

Figure 1:
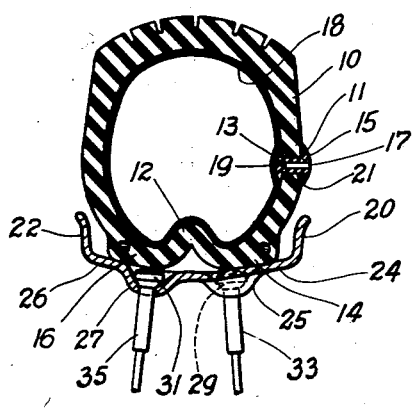
Figure 1 shows a cross sectional end elevation of a bicycle wheel showing a tubeless bicycle tire mounted on a rim prior to its being inflated.

In Figure 1, I have shown a self sealing tubeless tire mounted on a rim prior to its being inflated. The tubeless tire consists of a casing 10 having a fold or pleat 12 formed between the reinforced beads 14 and 16 and forming an integral part of said casing, which allow the beads to expand outwardly when the tire is inflated. The interior of the casing may be provided with a suitable conventional self sealing surface 18 which will maintain the casing airtight even if the casing is pierced by a nail or other object, or it may be of a suitable laminated construction wherein the self sealing effect is attained by the laminated construction of the tire casing.

The rim on which the casing 10 is mounted is provided with conventional side flanges 20 and 22 and has tapered bead seats 24 and 26 adjoining the flanges 20 and 22.

Figure 2:
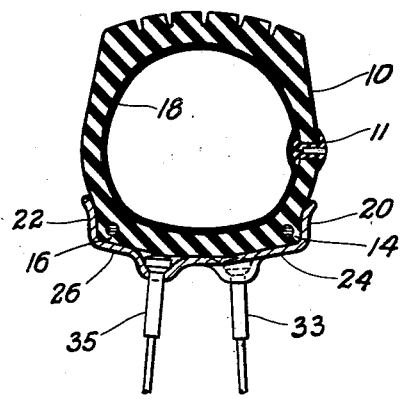
Figure 2 shows the tubeless bicycle tire and rim shown in Figure 1 after the tubeless tire has been inflated and seated on the rim.

When the tire 10 is inflated, the beads 14 and 16 will slide outwardly on the upwardly tapered portions 24 and 26 of the rim base in the manner shown in Figure 2 and seat themselves tightly thereon so that when the tire is fully inflated there will be no possibility of the tire moving relative to the rim. Hence there is no need for cementing the tire to the rim and there will be no danger of the stem being torn from the tire. In this regard, there is sufficient slack or material in the pleat portion 12 so that the outward movement of the beads is stopped by the bead riding up on the tapered bead seats 24 and 26 up against flanges 20 and 22 and not by the material 12 limiting the distance the beads 14 and 16 can spread apart.

The tire shown in Figure 1 may be provided with a conventional inwardly projecting valve stem (not shown) projecting through the rim base or may be inflated by a hollow needle inserted from the side of the tire through an air inflating plug 15 in a manner similar to inflating sporting goods such as footballs and basketballs. In the latter case, the hole in the self sealing plug would automatically reseal itself when the needle was withdrawn.

The inflating plug 11 is of such construction that the sides of the plug 13 and 15 overlap both sides of the surrounding surface of the casing immediately adjacent the hole 21 through which it projects. The contour of the plug inside the tire is dome shaped so that when the needle is withdrawn from the slit 19 and hole 17, not only will the natural springiness of the rubber in the plug tend to seal the slit 19 but the air pressure in the tire will exert physical pressure on the plug, thus causing lines of force to be exerted on the plug forcing the rubber to be squeezed toward the center of the plug slit 19 thus effecting an airtight seal. The plug is made from a suitable rubber which will readily yield to deformation but will immediately resume its original shape once the deforming force is removed, which characteristic not only helps to secure the plug in place but also prevents air from escaping past the plug.

Suitable, evenly spaced indentations 25 and 27 are provided in the rim, shown in Figure 1 for receiving the head ends 29 and 31 of the conventional threaded spoke nipples or fasteners 33 and 35 into which conventional spokes are threaded.

Figure 3:
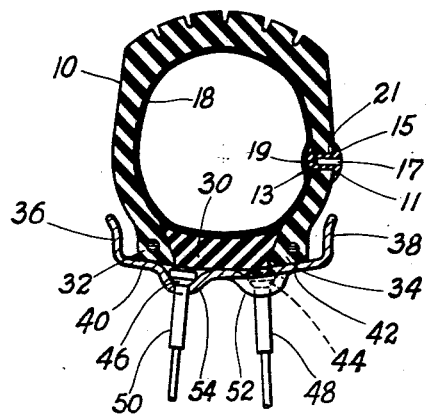
Figure 3 shows a modified form of bicycle wheel wherein the bead portion of the uninflated tubeless tire is joined together by a stretchable rubber strip which enables the bead portions of the tire to spread away from each other while maintaining an air tight seal between the beads when the beads are seated on the rim.
Figure 4:
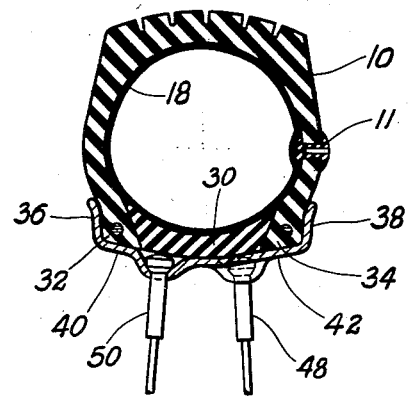
Figure 4 shows the tubeless bicycle tire and the rim shown in Figure 3 after the tubeless tire has been inflated and seated on the rim.

In the modified form of the invention shown in Figures 3 and 4, instead of employing a longitudinal fold or crease as shown in Figures 1 and 2, there is provided an extendable strip of rubber 30 integrally joined to the reinforced beads 32 and 34 as shown in Figure 3. When the tire is inflated, it causes the rubber strip to stretch sidewise as shown in Figure 4 thus enabling the sides of the beads 32 and 34 to contact the flanges 36 and 38 as shown in Figure 3.

When the beads 32 and 34 stretch outwardly in this manner, the extensible rubber strip 30 stretches in a like manner, thus causing the tire to seat itself firmly on the inclined, tapered bead seats 40 and 42.

Nipple indentations similar to those shown in Figures 1 and 2 are provided in the modified arrangement shown in Figure 3 wherein the heads 44 and 46 of the fastener nipples 48 and 50 are mounted in the evenly spaced indentations 52 and 54 formed in the rim. Suitable spokes are threaded into the spoke fastening nipples 48 and 50.

When the modified self sealing tire shown in Figure 3 is inflated, it will cause the rubber strip 30, intermediate beads 32 and 34 to stretch to allow the beads 32 and 34 to seat themselves firmly on the tapered portion 40 and 42 of the rim as shown in Figure 4.

From the foregoing description, it will be apparent I have provided a self sealing tire and rim which takes the place of the tubeless or solid tire employed in former years and the tube type tire commonly employed today. The tire is of simple construction and the air plug valve for sealing the same is of such design that it makes for an air tight seal not only by the natural expansion of the rubber in the seal but also because of its configuration, the air pressure in the tire physically seals the orifice of the valve. The embodiment I have shown avoids the difficulty formerly encountered wherein a tubeless tire would move relative to the rim if it were not firmly cemented in place and provides a tire that eliminates the difficulties found in tube or balloon type bicycle tires that are on the market today.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A self sealing tubeless tire and rim for bicycles comprising, an endless, closed tire casing having a hollow core formed therein, a self sealing compound formed on the inside surfaces of said endless casing to prevent air from escaping from said hollow core, the inner periphery of said closed casing having a foldable extendable pleat amalgamated with the casing to permit the bottom portion of the tire to be squeezed together to facilitate mounting the tire casing on the rim, the portions of the casing adjacent and amalgamated with said foldable extendable pleat being formed with reinforced beads, a rim having tapered bead seats, flanges adjoining the high portions of said tapered bead seats, means for inflating said self sealing tubeless tire to cause the beads of said tire to spread apart and slide upwardly on the tapered bead seats of said rim to firmly seat the tire casing on the rim to prevent relative movement between the tire and the rim, said foldable extendable pleat being flattened when said beads move outwardly on said tapered seats.

2. A bicycle wheel comprising a rim, bead engaging flanges extending around opposite sides of said rim, tapered bead seats formed on opposite sides of said rim and connecting with and adjoining said flanges, an endless, completely enclosed single tube tire, the outer periphery of said tire being shaped and formed to engage with a roadway and the inner periphery of said casing being adapted to be mounted on a rim, reinforced tire beads formed on opposite sides of said single tube tire on the inner periphery thereof, a fold formed in the tire casing between said beads and amalgamated therewith and means for inflating said single tube tire to cause the beads to move outwardly on said tapered bead seats up against said flanges to seat the tire on said rim to prevent relative movement between the tire and the rim, said fold being straightened out when said tire is inflated, and means for inflating said single tube tire.

3. A bicycle wheel comprising a rim, flanges formed on the sides of said rim, tapered bead seats formed on said rim adjacent said flanges, an endless single tube bicycle tire casing, a pair of reinforced beads formed around the inner periphery of said casing, an extendable rubber strip amalgamated with said beads to form an endless tubeless tire, the inside surfaces of said casing and strip having a self sealing substance formed thereon to prevent air from leaking out of said casing and means for inflating said tubeless tire to cause the beads to spread outwardly stretching the extendable rubber strip amalgamated with said beads to firmly seat said beads on said tapered bead seats up against said flanges to prevent relative movement between the tire casing and the rim.

References Cited in the file of this patent

UNITED STATES PATENTS

| | | |
|---|---|---|
| 541,075 | Davids | June 18, 1895 |
| 640,851 | Ancora | Jan. 9, 1900 |
| 670,725 | Pickett | Mar. 26, 1901 |
| 697,621 | Greene | Apr. 15, 1902 |
| 2,339,542 | Hale | Jan. 18, 1944 |
| 2,634,785 | Tubbs | Apr. 14, 1953 |
| 2,731,062 | Coben | Jan. 17, 1956 |

OTHER REFERENCES

Publication: "Tires-TBA Merchandising," June 1956, page 47.